United States Patent
Takemoto et al.

(10) Patent No.: US 8,976,428 B2
(45) Date of Patent: Mar. 10, 2015

(54) IMAGE INFORMATION MANAGING METHOD, IMAGE INFORMATION MANAGING APPARATUS AND IMAGE INFORMATION MANAGING SYSTEM FOR PREPARING AND MEASURING AN EVALUATION CHART

(71) Applicant: FUJIFILM Corporation, Tokyo (JP)

(72) Inventors: Fumito Takemoto, Ashigarakami-gun (JP); Yoshihiko Ishii, Ashigarakami-gun (JP); Koichi Tozuka, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 103 days.

(21) Appl. No.: 13/754,018

(22) Filed: Jan. 30, 2013

(65) Prior Publication Data
US 2013/0201532 A1 Aug. 8, 2013

(30) Foreign Application Priority Data

Feb. 7, 2012 (JP) ................................. 2012-023899

(51) Int. Cl.
H04N 1/46 (2006.01)
H04N 1/00 (2006.01)

(52) U.S. Cl.
CPC ....... H04N 1/00045 (2013.01); H04N 1/00015 (2013.01); H04N 1/00031 (2013.01); H04N 1/00053 (2013.01); H04N 1/00058 (2013.01); H04N 1/00071 (2013.01)
USPC ........... 358/504; 358/406; 358/505; 358/474; 358/488; 358/539

(58) Field of Classification Search
CPC .......... H04N 1/00015; H04N 1/00031; H04N 1/00045; H04N 1/00053; H04N 1/00058; H04N 1/00071
USPC ........ 358/406, 504, 505, 474, 488, 3.28, 539, 358/426.04, 426.12
See application file for complete search history.

(56) References Cited

U.S. PATENT DOCUMENTS 6,119,132 A * 9/2000 Kuwano ................................ 1/1
6,123,263 A * 9/2000 Feng ......................... 235/462.42
(Continued)

FOREIGN PATENT DOCUMENTS

JP 7-298075 A 11/1995
JP 2000-253252 A 9/2000
(Continued)

OTHER PUBLICATIONS

Japanese Office Action dated Dec. 10, 2013 issued in corresponding Japanese Patent Application No. 2012-023899 (Partial English translation is provided).

Primary Examiner — Benny Q Tieu
Assistant Examiner — Quyen V Ngo
(74) Attorney, Agent, or Firm — Birch, Stewart, Kolasch & Birch, LLP

(57) ABSTRACT

An evaluation chart has test patterns, a first code mark, and a second code mark. The evaluation chart is electronically read at one time to obtain first code information that specifies measuring conditions for the evaluation chart and second code information that specifies image forming conditions for the evaluation chart. Quantized information of the test patterns that is measured under the measuring conditions is associated with the image forming conditions.

9 Claims, 10 Drawing Sheets

(56) References Cited

U.S. PATENT DOCUMENTS

| | | | |
|---|---|---|---|
| 6,606,395 B1 * | 8/2003 | Rasmussen et al. | 382/112 |
| 6,975,418 B1 | 12/2005 | Ohta et al. | |
| 7,773,774 B2 * | 8/2010 | Rasmussen et al. | 382/112 |
| 8,150,106 B2 * | 4/2012 | Wu et al. | 382/112 |
| 8,276,049 B2 * | 9/2012 | Ishii | 714/776 |
| 2004/0026508 A1 * | 2/2004 | Nakajima et al. | 235/454 |
| 2007/0164115 A1 * | 7/2007 | Joseph et al. | 235/462.21 |

FOREIGN PATENT DOCUMENTS

| | | |
|---|---|---|
| JP | 2002-368933 A | 12/2002 |
| JP | 2005-159645 A | 6/2005 |
| JP | 2006-157207 A | 6/2006 |

* cited by examiner

FIG. 7

| | |
|---|---|
| TOTAL NUMBER OF REGIONS OF INTEREST | ⎫ |
| FILE NAME OF IMAGE DATA | ⎬ BASIC INFORMATION |
| IMAGE RESOLUTION | |
| ⋮ | ⎭ |
| TYPE OF POSITIONING MARK | ⎫ |
| POSITION OF POSITIONING MARK | ⎬ POSITIONING INFORMATION |
| ⋮ | ⎭ |
| POSITIONAL INFORMATION OF FIRST REGION OF INTEREST<br>·POSITION OF ORIGIN<br>·SIZE<br>·ANGULAR DISPLACEMENT | ⎫ STANDARD POSITIONAL INFORMATION |
| ⋮ | |
| POSITIONAL INFORMATION OF NTH REGION OF INTEREST | ⎭ |
| ANALYZING CONDITIONS FOR FIRST REGION OF INTEREST<br>·NAME OF ANALYZING MODULE<br>·ARGUMENT (IMAGE RESOLUTION, ETC.) | ⎫ ANALYZING CONDITION INFORMATION |
| ⋮ | |
| ANALYZING CONDITIONS FOR NTH REGION OF INTEREST | ⎭ |

70

IMAGE INFORMATION MANAGING METHOD, IMAGE INFORMATION MANAGING APPARATUS AND IMAGE INFORMATION MANAGING SYSTEM FOR PREPARING AND MEASURING AN EVALUATION CHART

CROSS-REFERENCE TO RELATED APPLICATION

This application is based upon and claims the benefit of priority from Japanese Patent Application No. 2012-023899 filed on Feb. 7, 2012, the contents of which are incorporated herein by reference.

BACKGROUND OF THE INVENTION

1. Field of the Invention

The present invention relates to an image information managing method, an image information managing apparatus, an image information managing system, and an evaluation chart for use in an image information managing method.

2. Description of the Related Art

Heretofore, it has been customary for the steady production of prints of stable quality to generate a certain evaluation chart with an image forming apparatus to be evaluated, and manage image information of the evaluation chart depending on the results of measurement and quantitative determination processes performed on the evaluation chart. Various processes have been proposed in the art to assign conditions under which the evaluation chart was generated (hereinafter referred to as "image forming conditions") to the evaluation chart.

For example, Japanese Laid-Open Patent Publication No. 07-298075, Japanese Laid-Open Patent Publication No. 2000-253252, Japanese Laid-Open Patent Publication No. 2006-157207, and Japanese Laid-Open Patent Publication No. 2005-159645 disclose evaluation charts with identifying information such as bar codes or the like assigned thereto by means of printing, adhesion, or the like.

SUMMARY OF THE INVENTION

The image information of evaluation charts generated by various image forming apparatus is usually managed within the respective scopes of the image forming apparatus, or specifically by the respective printers who have the image forming apparatus. Managing the image information requires each of the printers to have a measuring instrument installed, keep workers to deal with a measuring process, and update a database. Many of the printers have found it difficult to appropriately run the management system primarily from the standpoint of cost. One promising solution is a business model (service) wherein a series of operations regarding the management of image information is outsourced to an external contractor. The external contractor uses a measuring system and a database of its own for managing all the image information entrusted by a plurality of printers.

According to the above service, various evaluation charts generated at different places are collected into one or more sites where the measuring system is installed, and each of the collected evaluation charts is measured and quantitatively determined by an image evaluator using a measuring instrument whose accuracy has been properly controlled.

If the image evaluator measures an evaluation chart under wrong measuring conditions or measures a mistaken evaluation chart, then a quantitatively determined result that is different from the proper result is registered and managed in the database. The evaluation charts disclosed in Japanese Laid-Open Patent Publication No. 07-298075, Japanese Laid-Open Patent Publication No. 2000-253252, Japanese Laid-Open Patent Publication No. 2006-157207, and Japanese Laid-Open Patent Publication No. 2005-159645 allow the chart evaluator to acquire proper image forming conditions by reading the identifying information from the evaluation charts. However, the disclosed evaluation charts are unable to rule out the possibility that wrong quantitatively determined results will be associated with proper image forming conditions.

It is an object of the present invention to provide an image information managing method, an image information managing apparatus, an image information managing system, and an evaluation chart which permit image forming conditions for an evaluation chart to be properly associated with quantitatively determined results at all times even if the site where the evaluation chart is generated and the site where the evaluation chart is measured are geographically spaced from each other.

According to an aspect of the present invention, there is provided an image information managing method for managing quantified information produced by measuring an evaluation chart on a recording medium and quantifying quality of the measured evaluation chart, comprising the steps of preparing the evaluation chart having test patterns including a pattern to be quantified, and a first code mark and a second code mark which are encoded according to a prescribed code conversion law, electronically reading the prepared evaluation chart at one time to acquire first code information representative of the first code mark and second code information representative of the second code mark, acquiring measuring conditions for the evaluation chart which are specified by the first code mark by decoding the acquired first code information according to the prescribed code conversion law, acquiring image forming conditions for the evaluation chart which are specified by the second code mark by decoding the acquired second code information according to the prescribed code conversion law, and associating the quantified information of the test patterns which is measured under the measuring conditions with the acquired image forming conditions.

As described above, an evaluation chart is electronically read at one time to obtain first code information for specifying measuring conditions for the evaluation chart, and second code information for specifying image forming conditions for the evaluation chart, and the quantified information of test patterns measured under the measuring conditions are associated with the image forming conditions. Consequently, the image forming conditions for the evaluation chart and the quantified results thereof can properly be associated with each other at all times. The proper association is particularly effective if the site where the evaluation chart is generated and the site where the evaluation chart is measured are geographically spaced from each other.

The image information managing method should preferably further comprise the step of determining a file format for managing the quantified information depending on the measuring conditions, and the step of associating quantified information should preferably comprise the step of generating a data file including the quantified information and the image forming conditions for the evaluation chart according to the determined file format.

The step of preparing the evaluation chart should preferably comprise the step of separately forming the first code mark on the recording medium on which the test patterns and the second code mark have already been formed. Therefore, even under different image forming conditions, the evaluation chart having a common image may be produced, and a common measuring and evaluating process may be used. The evaluation process is thus easily performed.

The step of preparing the evaluation chart should preferably comprise the step of separately forming the second code mark on the recording medium on which the test patterns and the first code mark have already been formed. Even if a different measuring and evaluating process is used for the evaluation chart having the same image, such a different measuring and evaluating process can easily be reflected.

The step of acquiring image forming conditions should preferably comprise the step of acquiring, as one of the image forming conditions, inherent identifying information assigned to the evaluation chart.

The image information managing method should preferably further comprise the step of successively storing generated data files to construct a database of the quantified information.

According to another aspect of the present invention, there is provided an image information managing apparatus for managing quantified information produced by measuring an evaluation chart on a recording medium and quantifying quality of the measured evaluation chart, comprising an image input unit for entering first code information representative of a first code mark and second code information representative of a second code mark which are produced by electronically reading, at one time, the evaluation chart having test patterns including a pattern to be quantified, and the first code mark and the second code mark which are encoded according to a prescribed code conversion law, a first condition acquirer for decoding the first code information entered by the image input unit according to the prescribed code conversion law to acquire measuring conditions for the evaluation chart which are specified by the first code mark, a second condition acquirer for decoding the second code information entered by the image input unit according to the prescribed code conversion law to acquire image forming conditions for the evaluation chart which are specified by the second code mark, and an image information associator for associating the quantified information of the test patterns which is measured under the measuring conditions acquired by the first condition acquirer with the image forming conditions acquired by the second condition acquirer.

According to still another aspect of the present invention, there is provided an image information managing system for managing quantified information produced by measuring an evaluation chart on a recording medium and quantifying quality of the measured evaluation chart, comprising an image reader for obtaining first code information representative of a first code mark and second code information representative of a second code mark which are produced by electronically reading, at one time, the evaluation chart having test patterns including a pattern to be quantified, and the first code mark and the second code mark which are encoded according to a prescribed code conversion law, a first condition acquirer for decoding the first code information obtained by the image reader according to the prescribed code conversion law to acquire measuring conditions for the evaluation chart which are specified by the first code mark, a second condition acquirer for decoding the second code information obtained by the image reader according to the prescribed code conversion law to acquire image forming conditions for the evaluation chart which are specified by the second code mark, and an image information associator for associating the quantified information of the test patterns which is measured under the measuring conditions acquired by the first condition acquirer with the image forming conditions acquired by the second condition acquirer.

According to yet another aspect of the present invention, there is provided an evaluation chart for use in the above image information managing method.

With the image information managing method, the image information managing apparatus, the image information managing system, and the evaluation chart according to the present invention, an evaluation chart is electronically read at one time to obtain first code information for specifying measuring conditions for the evaluation chart, and second code information for specifying image forming conditions for the evaluation chart, and the quantified information of test patterns measured under the measuring conditions are associated with the image forming conditions. Consequently, the image forming conditions for the evaluation chart and the quantified results thereof can properly be associated with each other at all times. The proper association is particularly effective if the site where the evaluation chart is generated and the site where the evaluation chart is measured are geographically spaced from each other.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a diagram showing a data structure of a measuring condition file;

DESCRIPTION OF THE PREFERRED EMBODIMENTS

An image information managing method according to a preferred embodiment of the present invention in relation to an image information managing apparatus, an image information managing system, and an evaluation chart which carry out the image information managing method will be described in detail below with reference to the accompanying drawings. Hereinafter, forming an image will also be referred to as "printing".

Figure 1:
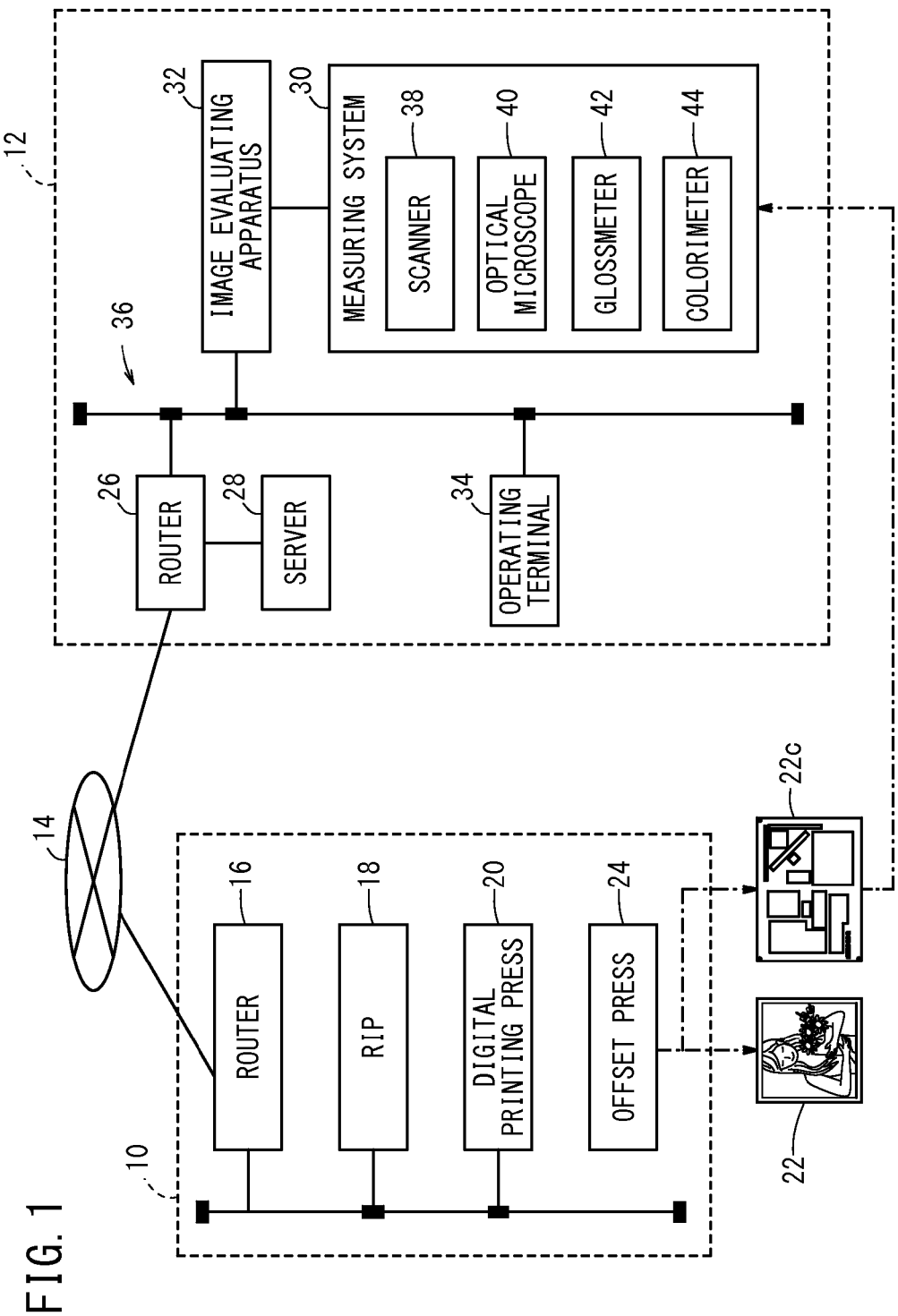
FIG. 1 is a block diagram of an image information managing system according to an embodiment of the present invention.

FIG. 1 shows in block form an image information managing system 12 according to an embodiment of the present invention. As shown in FIG. 1, the image information managing system 12 is connected to a print production system 10 by a network 14.

The print production system 10 includes a router 16 as a device for connection to the network 14, a RIP (Raster Image Processor) 18 for performing various image processing processes including a rasterizing process, a color converting process, etc. on proof data or platemaking data, a digital printing press 20 for producing prints based on platemaking data sent from the RIP 18, and an offset press 24 for producing a print 22 which includes an evaluation chart 22c with printing plates, not shown, mounted thereon.

The digital printing press 20 is an apparatus for directly forming an image on a print medium, i.e., a recording medium, to produce a print 22, without using printing plates, not shown. The digital printing press 20 may be in the form of an ink jet color proofer, a color laser printer (electrophotographic printer), or the like. The offset press 24 produces the print 22 by applying inks to a print medium through printing plates and intermediate ink transfer members, not shown.

The image information managing system 12 serves to quantify the quality (image quality and image appearance) of the evaluation chart 22c produced by the print production system 10, and manage image information including information representative of the quantified quality.

The image information managing system 12 includes a router 26 as a device for connection to the network 14, a server 28 accessible from various terminal devices belonging to an internal network and an external network, a measuring system 30 for measuring the evaluation chart 22c, an image evaluating apparatus 32 (image information managing apparatus) for quantifying the quality of the evaluation chart 22c based on image data Id (see FIG. 2) which are generated by electronically reading the evaluation chart 22c, and an operating terminal 34 for browsing the quantified quality of the evaluation chart 22c which is generated by the image evaluating apparatus 32.

The server 28 is a device for managing all of various data about the measurement and evaluation of the evaluation chart 22c. The server 28 is connected to the image evaluating apparatus 32 and the operating terminal 34 for communication therewith through a LAN (Local Area Network) 36 constructed in the image information managing system 12. The server 28 is also connected to a working terminal, i.e., the RIP 18 in FIG. 1, in the print production system 10 through the router 26 and the network 14.

The measuring system 30 optically reads the evaluation chart 22c to acquire optical information, e.g., two-dimensional image data Id, of the evaluation chart 22c. The measuring system 30 includes a scanner 38 (image reader), an optical microscope 40, a glossmeter 42, and a colorimeter 44. The measuring system 30 is not limited to the illustrated type and setup, but may comprise various other components. For example, the scanner 38 may be a flatbed scanner for reading reflective documents or a film scanner for reading transmissive documents.

Figure 2:
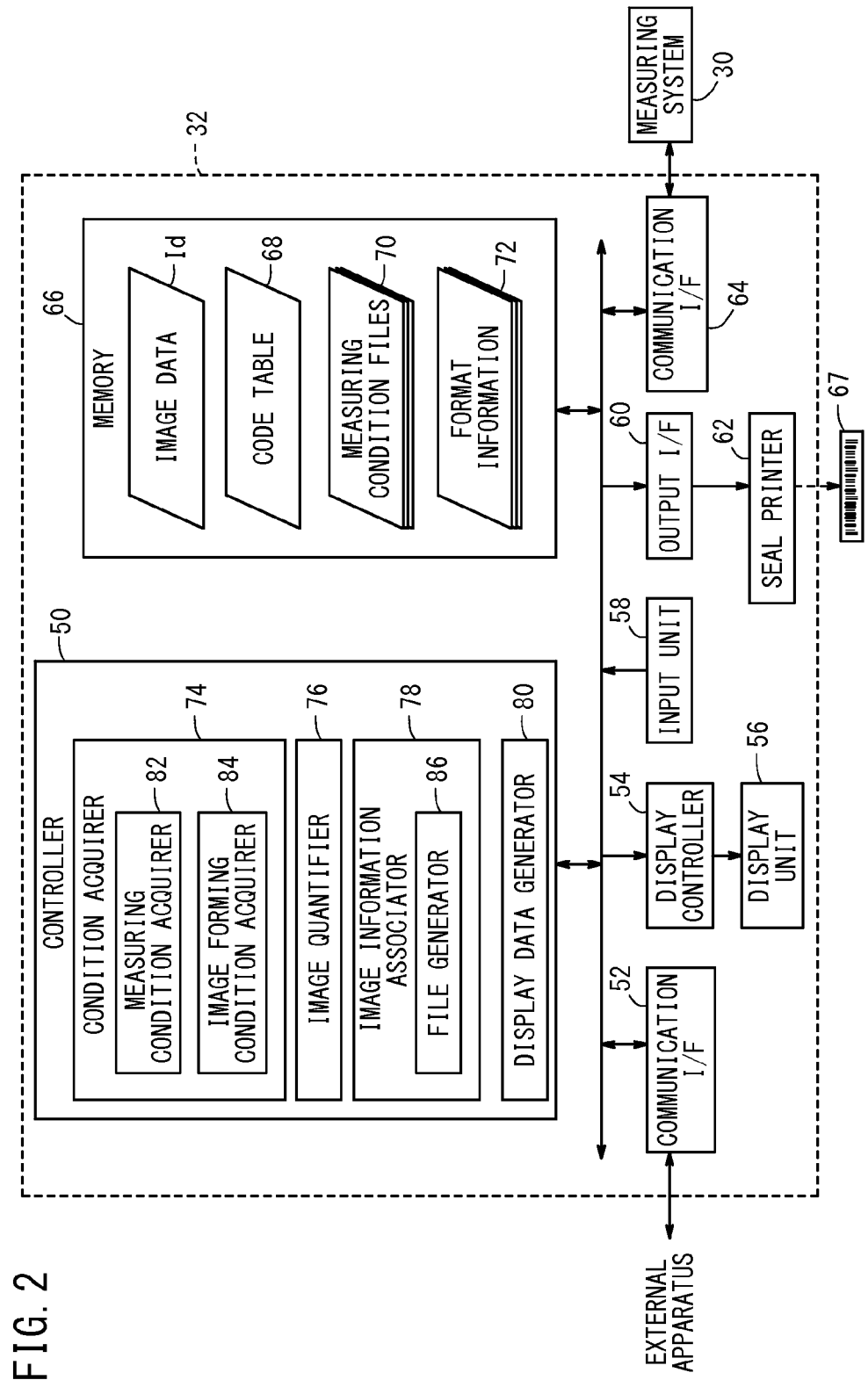
FIG. 2 is an electric block diagram of an image evaluating apparatus shown in FIG. 1.

FIG. 2 is an electric block diagram of the image evaluating apparatus 32 shown in FIG. 1.

As shown in FIG. 2, the image evaluating apparatus 32 comprises a computer having a controller 50, a communication I/F 52, a display controller 54, a display unit 56, an input unit 58, an output I/F 60, a seal printer 62, a communication I/F 64 (image input unit), and a memory 66.

The communication I/F 52 is an interface for sending and receiving electric signals to and from external apparatus. For example, the image evaluating apparatus 32 can send and receive various data files to and from the server 28 (see FIG. 1), for example, through the communication I/F 52.

The display controller 54 is a control circuit that is controlled by the controller 50 to energize the display unit 56. In a case where the display controller 54 outputs a display control signal to the display unit 56 through an I/F, not shown, the display unit 56 is energized to display various images including a window W1 (see FIG. 6).

The input unit 58 comprises various input devices including a mouse, a trackball, a keyboard, etc. for entering various signals from the user of the image evaluating apparatus 32. The display function of the display unit 56 and the input function of the input unit 58 are combined into a user interface.

Figure 4:
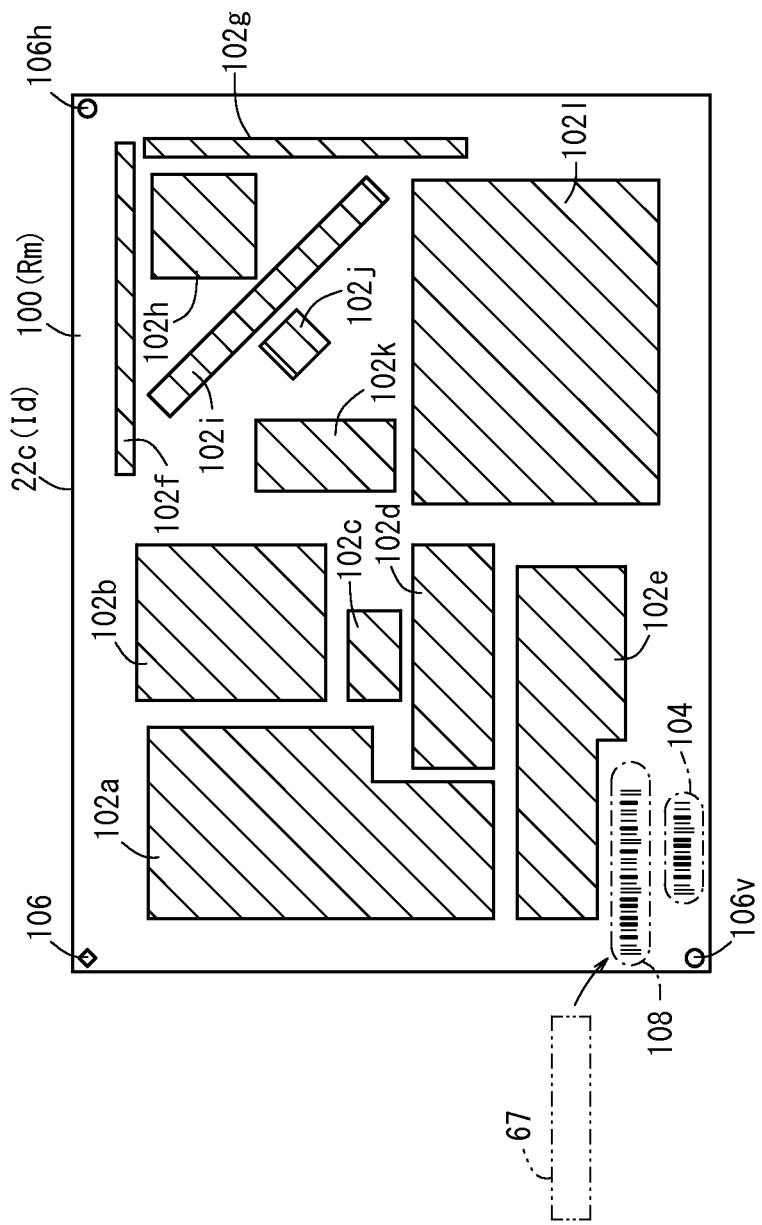
FIG. 4 is a front elevational view of an evaluation chart shown in FIG. 1.

The seal printer 62 is a device for outputting a bar-code seal 67 marked with a bar code, e.g., a second bar code 108 shown in FIG. 4, that is encoded according to a given code conversion law.

The communication I/F 64 is an interface for sending and receiving various data about measurement to and from various measuring devices in the measuring system 30. Actually, the communication I/F 64 comprises a plurality of communication I/Fs through which the image evaluating apparatus 32 is electrically connected to the measuring devices in the measuring system 30. For illustrative purpose, those communication I/Fs are shown as one I/F, i.e., the communication I/F 64.

The memory 66 stores programs and data which are required by the controller 50 to control various components of the image evaluating apparatus 32. In FIG. 2, the data stored in the memory 66 include image data Id representative of the evaluation chart 22c, a code table 68 (code conversion law), measuring condition files 70 (measuring conditions), and format information 72. The memory 66 may be a non-transitory, computer-readable storage medium such as a nonvolatile memory, a hard disk, or the like.

The controller 50 comprises a processor such as a CPU (Central Processing Unit) or the like. The controller 50 reads the programs stored in the memory 66 to carry out various functions that include a condition acquirer 74, an image quantifier 76, an image information associator 78 (image information associating means), and a display data generator 80.

The condition acquirer 74 acquires various conditions about image information of the evaluation chart 22c. Specifically, the condition acquirer 74 includes a measuring condition acquirer 82 (first condition acquirer, first condition acquiring means) for acquiring measuring conditions depending on the type of the evaluation chart 22c and the acquired state of the image data Id, and an image forming condition acquirer 84 (second condition acquirer, second condition acquiring means) for acquiring image forming conditions for the evaluation chart 22c.

The image quantifier 76 captures a plurality of regions 120 of interest (see FIG. 8) from an image region (measurement target region Rm to be described later) represented by the image data Id, and quantifies the regions 120 of interest with respect to each of pre-designated evaluation items, thereby producing quantitative information of the evaluation chart 22c. The evaluation items may be known evaluation indexes including, for example, noise/granularity, NPS (Noise Power Spectrum), in-plane color uniformity, CTF (Contrast Transfer Function), MTF (Modulation Transfer Function), acutance, gradation, color reproducibility, banding, striped irregularity, raggedness, and image distortion.

The image information associator 78 associates the quantitative information of the evaluation chart 22c with the image forming conditions for the evaluation chart 22c. Specifically, the image information associator 78 has a file generator 86 for generating a data file (hereinafter referred to as "measurement result file") including the quantitative information from the image quantifier 76 and the image forming conditions from the image forming condition acquirer 84 according to a file format for managing quantitative information.

The display data generator 80 generates a registration screen 200 (see FIG. 6) and a retrieval screen 220 (see FIG. 10) which are to be displayed on the display unit 56.

The image information managing system 12 is basically constructed as described above. Operation of the image information managing system 12 will be described below with reference to FIG. 3 as well as FIGS. 1 and 2.

Figure 3:
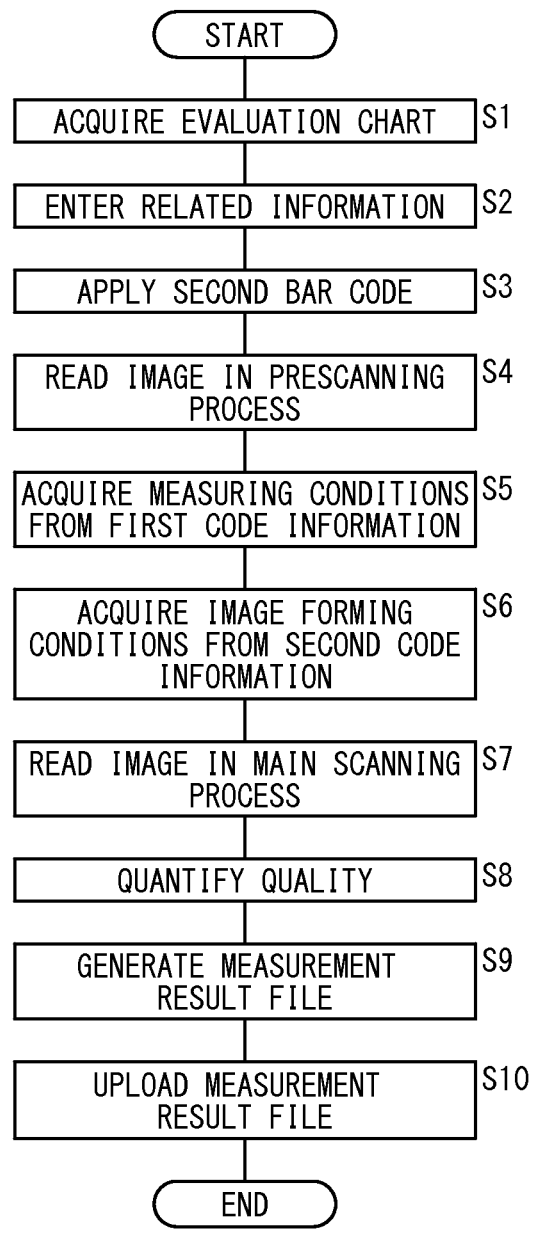
FIG. 3 is a flowchart of an operation sequence of the image information managing system shown in FIG. 1.

In step S1 shown in FIG. 3, an image evaluator as the user acquires an evaluation chart 22c, which is a target object whose quality is to be quantified. In FIG. 1, the printer uses the offset press 24 in the print production system 10 to print the evaluation chart 22c, and then sends the printed evaluation chart 22c to a site (delivery site) where the image information managing system 12 is installed.

Figure 5:
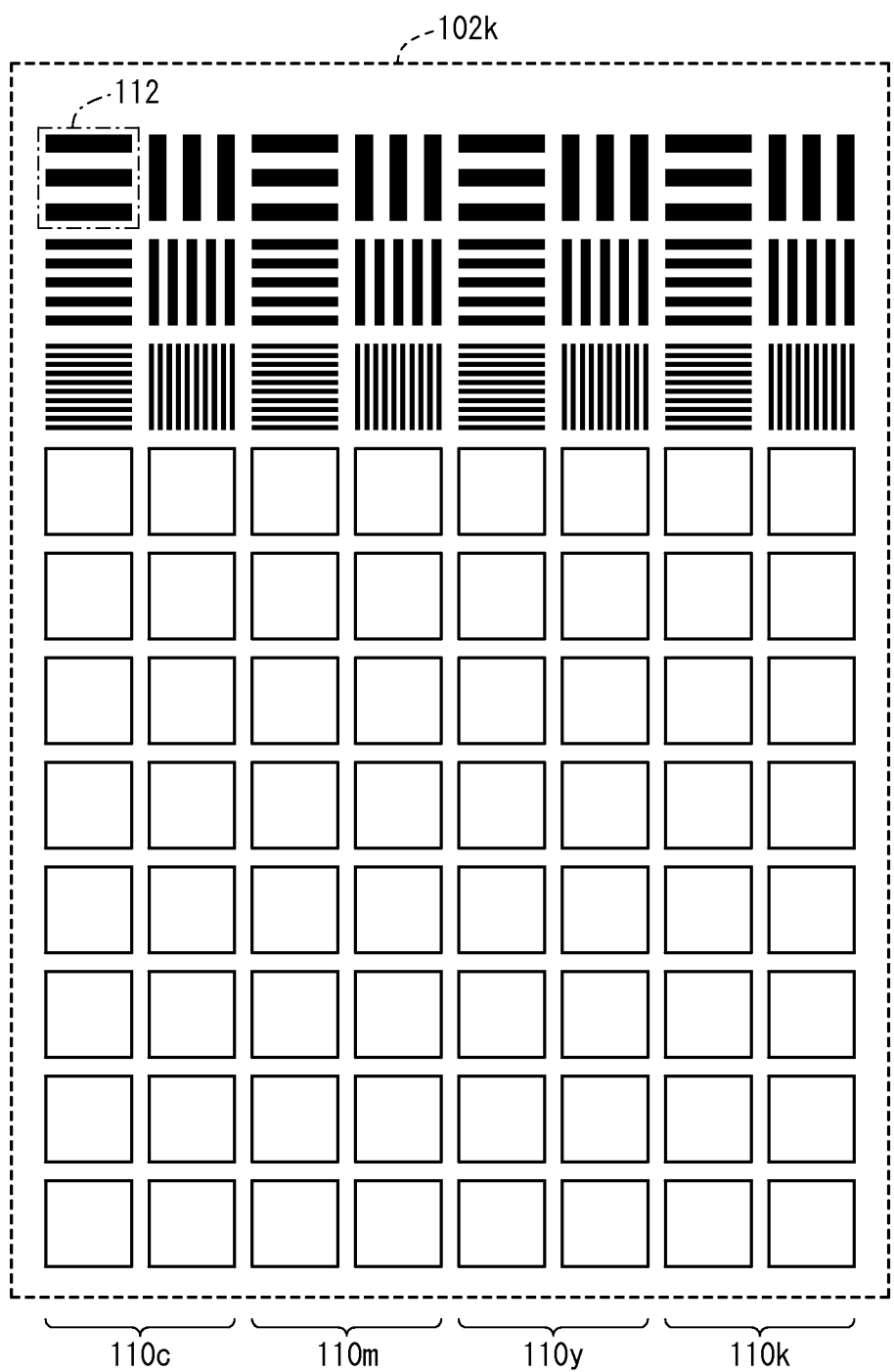
FIG. 5 is an enlarged view of a portion of the evaluation chart shown in FIG. 4.

FIG. 4 is a front elevational view of the evaluation chart 22c shown in FIG. 1, and FIG. 5 is an enlarged view of a portion of the evaluation chart 22c shown in FIG. 4.

As shown in FIG. 4, the evaluation chart 22c includes twelve test patterns 102a through 102l on a rectangular sheet 100 as a recording medium. Each of the test patterns 102a through 102l, shown hatched for simplification of illustration, is a pattern which is suitable for quality quantification. For example, a test pattern for evaluating color reproducibility is made up of a plurality of color patches of different colors, and a test pattern for evaluating the smoothness of a gradation curve is made up of a gradation image. A specific example of the image of a test pattern will be described below.

As shown in FIG. 5, the test pattern 102k has monochromatic CTF charts 110c, 110m, 110y, 110k for evaluating the sharpness of an image. The CTF chart 110c, which is printed in a single color of C (Cyan), has a total of 22 sub-patterns 112 each comprising a set of thin lines (vertical or horizontal lines). The CTF charts 110m, 110y, 110k, which are printed in respective single colors of M (Magenta), Y (Yellow), and K (black), are of the same setup as the CTF chart 110c.

The sub-patterns 112 are spaced at substantially equal intervals along the vertical directions of the CTF chart 110c. For illustrative purposes, those sub-patterns 112 down to the third one from above are illustrated in detail, and the remaining sub-patterns 112 are illustrated in contour only. As can be seen from FIG. 5, the width of the thin lines in the sub-patterns 112 is progressively smaller along the downward direction of the CTF chart 110c. In other words, the spatial frequency (unit: cycle/mm) to be evaluated is progressively higher along the downward direction of the CTF chart 110c.

As shown in FIG. 4, as well as the test patterns 102a through 102l, the sheet 100 is also printed with a first bar code 104 (first code mark) that extends horizontally, and three positioning marks including a referenced mark 106 and first and second marks 106h, 106v. The first bar code 104, which is present on a lower left area of the sheet 100, is a code mark representative of encoded management information, specifically, measuring conditions. The three positioning marks 106, 106h, 106v, which are present at respective three corners of the sheet 100, are marks for detecting the position and posture of the evaluation chart 22c in the image region (measurement target region Rm) represented by the image data Id.

The first bar code 104 comprises a plurality of parallel linear elements arrayed along a given direction. The linear elements have their widths determined according to a certain code conversion law, e.g., ITF (Interleaved Two of File) code, CODE 39, CODE 128, NW-7, or the like. The first bar code 104 is not limited to the one-dimensional code shown in FIG. 4, but may be a two-dimensional code such as QR code (registered trademark).

The positioning mark 106 is located at a point where a line segment interconnecting the positioning marks 106, 106h and a line segment interconnecting the positioning marks 106, 106v join each other perpendicularly.

At the time the evaluation chart 22c is produced by the offset press 24 etc., a blank area having a given size is provided on a lower left corner of the evaluation chart 22c, or specifically between the test pattern 102e and the first bar code 104.

In a case where the image data Id (see FIG. 2) are made visual, a visible image which is substantially similarly shaped as shown in FIGS. 4 and 5 is produced in the measurement target region Rm. For an easier understanding of the present invention, an image object on the evaluation chart 22c and an image object on the image data Id will occasionally be described interchangeably, and an image region represented by the sheet 100 and the measurement target region Rm will also occasionally be described interchangeably.

In step S2, the image evaluator enters various items of information related to the evaluation chart 22c produced in step S1 through the input unit 58. Before these items of information are entered, the display data generator 80 generates display data for the registration screen 200, and supplies the generated display data to the display controller 54, which controls the display unit 56 to display the window W1, including the registration screen 200, based on the supplied display data.

Figure 6:
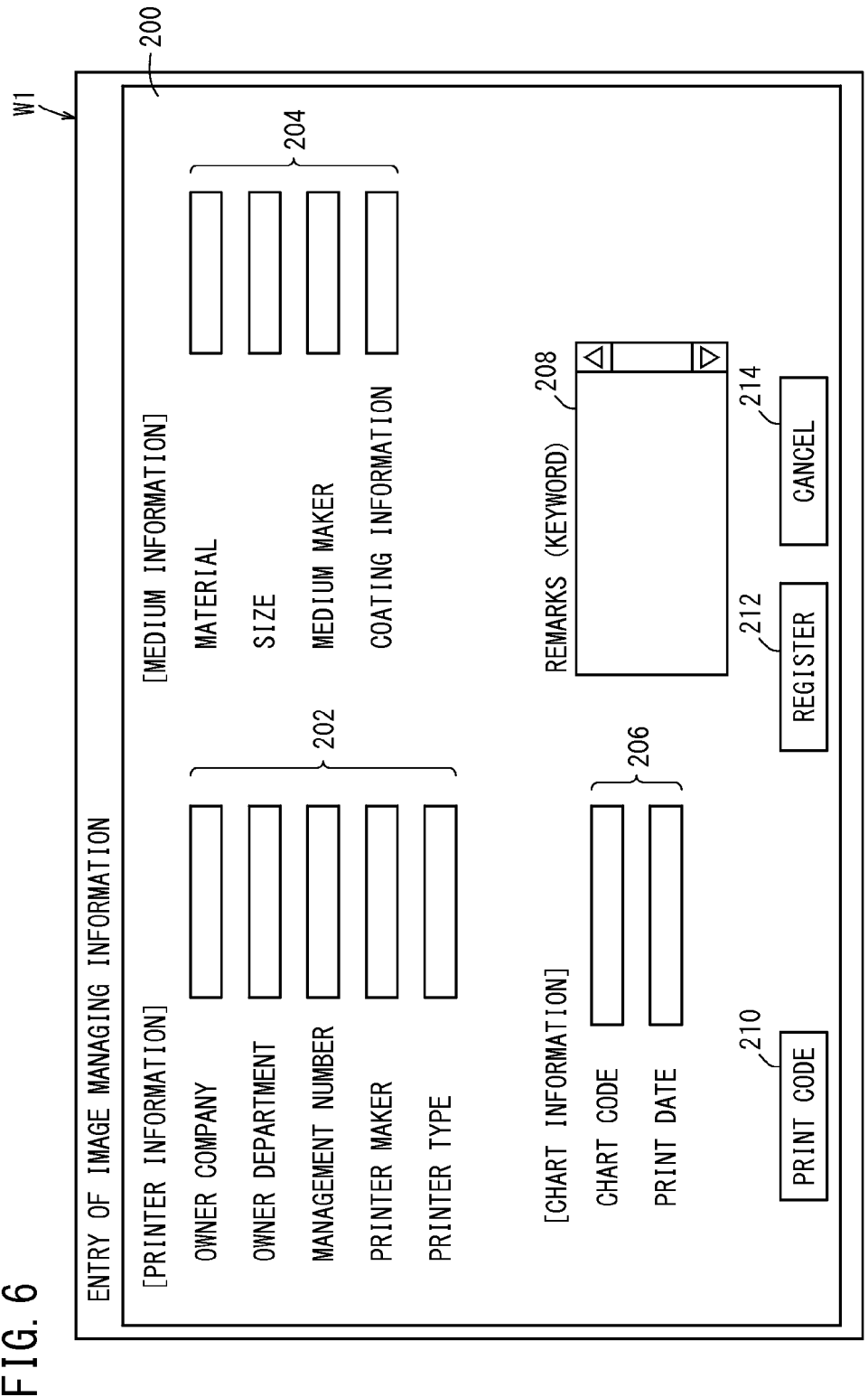
FIG. 6 is a view showing a displayed image representing a screen for registering image management information.

As shown in FIG. 6, the registration screen 200 has a first input field 202 for entering various items of information ("PRINT INFORMATION" in FIG. 6) relative to an image forming apparatus including the offset press 24, a second input field 204 for entering various items of information ("MEDIUM INFORMATION" in FIG. 6) relative to recording mediums including the sheet 100, a third input field 206 for entering various items of information ("CHART INFORMATION" in FIG. 6) relative to the evaluation chart 22c, a remark field 208 for entering desired text information, a button 210 representing "PRINT CODE", a button 212 representing "REGISTER", and a button 214 representing "CANCEL".

The first input field 202 is a field for entering a company owing the image forming apparatus (offset press 24), a department of the company where the image forming apparatus is installed, a management number, a printer manufacturer (manufacturer's name), and a printer type. The second input field 204 is a field for entering a material of the sheet 100, a size of the sheet 100, a medium manufacturer (manufacturer's name), and coating information. The third input field 206 is a field for entering a chart code for identifying the evaluation chart 22c and a date at which the evaluation chart 22c is printed.

These items of information to be entered may be items of information attached to the evaluation chart 22c in a case where it is sent (step S1), or items of information accumulated in advance in the server 28 through the RIP 18 (see FIG. 1).

If the image evaluator clicks the "REGISTER" button 212, the related information that has presently been entered in the registration screen 200 is stored in the server 28. Thereafter, a chart ID associated with the registered related information is given. The chart ID is an identification number unique to the evaluation chart 22c. If the image evaluator clicks the "CANCEL" button 214, the window W1 is closed, and the entering and registering process is canceled.

In step S3, the image evaluator applies a second bar code 108 to a given location, i.e., the blank area referred to above, on the evaluation chart 22c.

In FIG. 6, if the image evaluator clicks the "PRINT CODE" button 210, the controller 50 encodes the chart ID given in step S2 into second code information, and generates print data including the second code information. The controller 50 then supplies the generated print data to the seal printer 62 through the output I/F 60. The seal printer 62 then operates to print a bar-code seal 67 marked with the second bar code 108. As with the first bar code 104, the second bar code 108 may be a one-dimensional code or a two-dimensional code. The second bar code 108 may be encoded according to a code conversion law which may be the same as or different from the code conversion law used to encode the first bar code 104.

The image evaluator applies the bar code seal 67 to a given location, i.e., above the first bar code 104 in FIG. 4, on the evaluation chart 22c. The evaluation chart 22c now has the two bar codes, i.e., the first bar code 104 and the second bar code 108, thereon. For illustrative purposes, the evaluation chart 22c with the bar code seal 67 applied thereto will hereinafter also be referred to as "evaluation chart 22c" in the same manner as before the bar code seal 67 is applied.

According to the present embodiment, the second bar code 108 is separately applied to the sheet 100 with the test patterns 102a through 102l and the first bar code 104 already printed thereon. Therefore, even under different image forming conditions, the evaluation chart 22c having a common image may be produced. The evaluation process is thus easily performed.

Conversely, rather than the second bar code 108, the first bar code 104 may be separately applied to the sheet 100. In this case, even if a different measuring and evaluating process is used for the evaluation chart 22c having the same image, such a different measuring and evaluating process can easily be reflected. Further alternatively, first and second code information may be incorporated in advance in the image region of print data representative of the evaluation chart 22c, and the first bar code 104 and the second bar code 108 may be printed at one time by the image forming apparatus such as the offset press 24.

In step S4, the scanner 38 reads, in a prescanning process, the image of the evaluation chart 22c to produce image data Id that has an image resolution r1 [dpi (dot per inch)] (first image resolution). The prescanning process refers to a mode for reading the image of the evaluation chart 22c with a relatively low resolution. A main scanning process, to be described later, refers to a mode for reading the image of the evaluation chart 22c with a relatively high resolution r2 [dpi] (second image resolution: r2>r1) to produce image data Id.

In the prescanning process, the scanner 38 detects objects that can be recognized at a relatively low resolution, e.g., the first bar code 104 and the positioning mark 106. Therefore, the amount of image data used to detect objects can be reduced, and hence the processing time required to detect objects can be shortened.

In a case where the first bar code 104 and the second bar code 108 are to be read at different timings, the image evaluator may possibly mistake another evaluation chart for the evaluation chart 22c in error. To avoid such trouble, the first bar code 104 and the second bar code 108 are electronically read at one time to associate the respective code information with each other through the image data Id. The term "one time" means not only "the same time", but also "substantially the same time" which covers a time interval that can be recognized as "the same time" by the image evaluator. The image data Id thus acquired include first code information, i.e., an image area corresponding to the first bar code 104, and second code information, i.e., an image area corresponding to the second bar code 108.

In step S5, the measuring condition acquirer 82 detects and decodes the first code information included in the image data Id to acquire measuring conditions for the evaluation chart 22c. Specifically, the measuring condition acquirer 82 captures a certain image area from the measurement target region Rm, and then acquires first code information from the values of a series of pixels along a predetermined direction in the captured image area. Thereafter, the measuring condition acquirer 82 decodes the first code information according to the code table 68 (code conversion law) stored in the memory 66, into identifying information (hereinafter referred to as "sample ID") that identifies the type of the evaluation chart 22c.

Thereafter, the measuring condition acquirer 82 selects and reads one of the measuring condition files 70 stored in the memory 66, depending on the obtained sample ID of the evaluation chart 22c.

As shown in FIG. 7, each of the measuring condition files 70 has a data structure including basic information common to various measuring and evaluating events, positioning information which serves as information about the positioning mark 106, standard positional information about regions 120 of interest (see FIG. 8), and analyzing condition information about analyzing conditions for regions 120 of interest. Each of the measuring condition files 70 is not limited to the data structure shown in FIG. 7, but may be of any other data structures.

The basic information may include the total number of regions 120 of interest (N regions 120 of interest), the file name of the image data Id, the image resolutions (r1, r2), etc. The positional information may include the types, positions, etc. of the positioning marks 106, 106h, 106v. The standard positional information includes the positions of origins, sizes, angular displacements, etc. of the respective regions 120 of interest. The analyzing condition information includes the names of analyzing modules (evaluation items) for the respective regions 120 of interest, the arguments (e.g., the image resolution r2) for the respective analyzing modules, etc.

Figure 8:
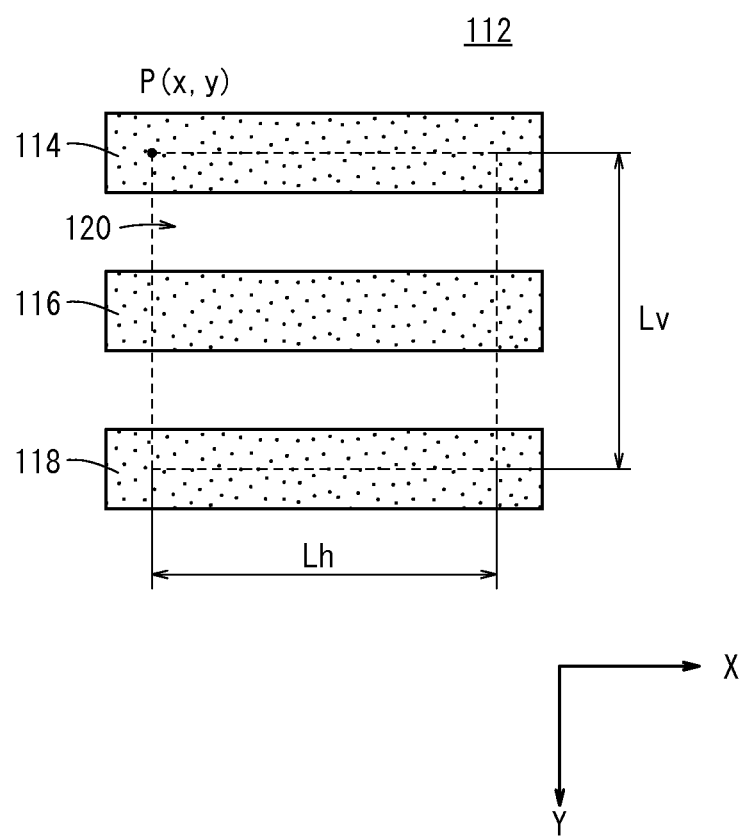
FIG. 8 is an enlarged view of a sub-pattern shown in FIG. 5.

FIG. 8 is an enlarged view of one of the sub-patterns 112 shown in FIG. 5. The sub-pattern 112 shown in FIG. 8 comprises three thin lines 114, 116, 118 extending along an X-axis direction. The rectangular region 120 of interest lies across the three thin lines 114, 116, 118. According to the data structure shown in FIG. 7, the positional information for the region 120 of interest includes an origin position P (x, y), a size (Lv, Lh), and an angular displacement 0 [degree].

The measuring condition acquirer 82 may calculate the positional relationship between the positioning marks 106, 106h, 106v detected in step S5, and correct the positional information of the regions 120 of interest according to a known image converting process such as an Affine transformation process, an image scaling process, or the like.

In step S6, the image forming condition acquirer 84 detects and decodes the second code information included in the image data Id to acquire measuring conditions for the evaluation chart 22c. Specifically, the image forming condition acquirer 84 captures a certain image area from the measurement target region Rm, and then acquires second code information from the values of a series of pixels along a predetermined direction in the captured image area. Then, the image forming condition acquirer 84 decodes the second code information according to the code table 68 (predetermined code conversion law) stored in the memory 66, into a chart ID.

Thereafter, the image forming condition acquirer 84 receive related information associated with the chart ID from the server 28 to acquire image forming conditions for the evaluation chart 22c. In this manner, even if the person who carried out step S3 (the application of the second bar code 108) is different from the person who carried out step S4 (the prescanning process), image forming conditions depending on different evaluation charts 22c can be acquired without fail.

The image forming conditions include the name of a printing company, the name of a printing press, the type and size of the sheet 100, the size of printing plates, color plates, a printing mode, the type of an ICC profile, etc. Specifically, the image forming conditions for the offset press 24 include a printing press, a sheet, inks, a screen type, a resolution, a screen ruling, an angle set, a dot gain curve, etc. The image forming conditions may include not only data directly involved in a printing process, but also data (so-called meta data) ancillary to those data.

In step S7, the scanner 38 reads the image of the evaluation chart 22c in the main scanning process to acquire image data Id that has an image resolution r1 [dpi]. In order to increase the accuracy with which to designate the position of the regions 120 of interest, it is preferable to acquire the image data Id having the resolutions r1, r2 in substantially the same measuring environments. For example, it is preferable to successively acquire the image data Id having the resolutions r1, r2 by reading twice the image of the evaluation chart 22c that has been set in a given position in the scanner 38.

In step S8, the image quantifier 76 analyzes the image data Id acquired in step S7 according to the measuring conditions acquired in step S5. Now, a result (quantified information) representative of the quantified quality of the evaluation chart 22c can be obtained.

In step S9, the file generator 86 generates a measurement result file according to a given file format based on the quantified information obtained in step S8. Prior to generating such a measurement result file, the image information associator 78 determines a file format for managing the quantified information depending on the measuring conditions. Specifically, the image information associator 78 selects and reads one of a plurality of items of format information 72 stored in the memory 66 depending on the sample ID obtained in step S5 (see FIG. 6). It is preferable to have a plurality of items of format information 72 because there are different measurement items for different images for the evaluation chart 22c.

Available file formats may be a common format or different formats. According to the present embodiment, file formats that can be browsed using general-purpose spreadsheet software are used for better user's convenience.

Figure 9:
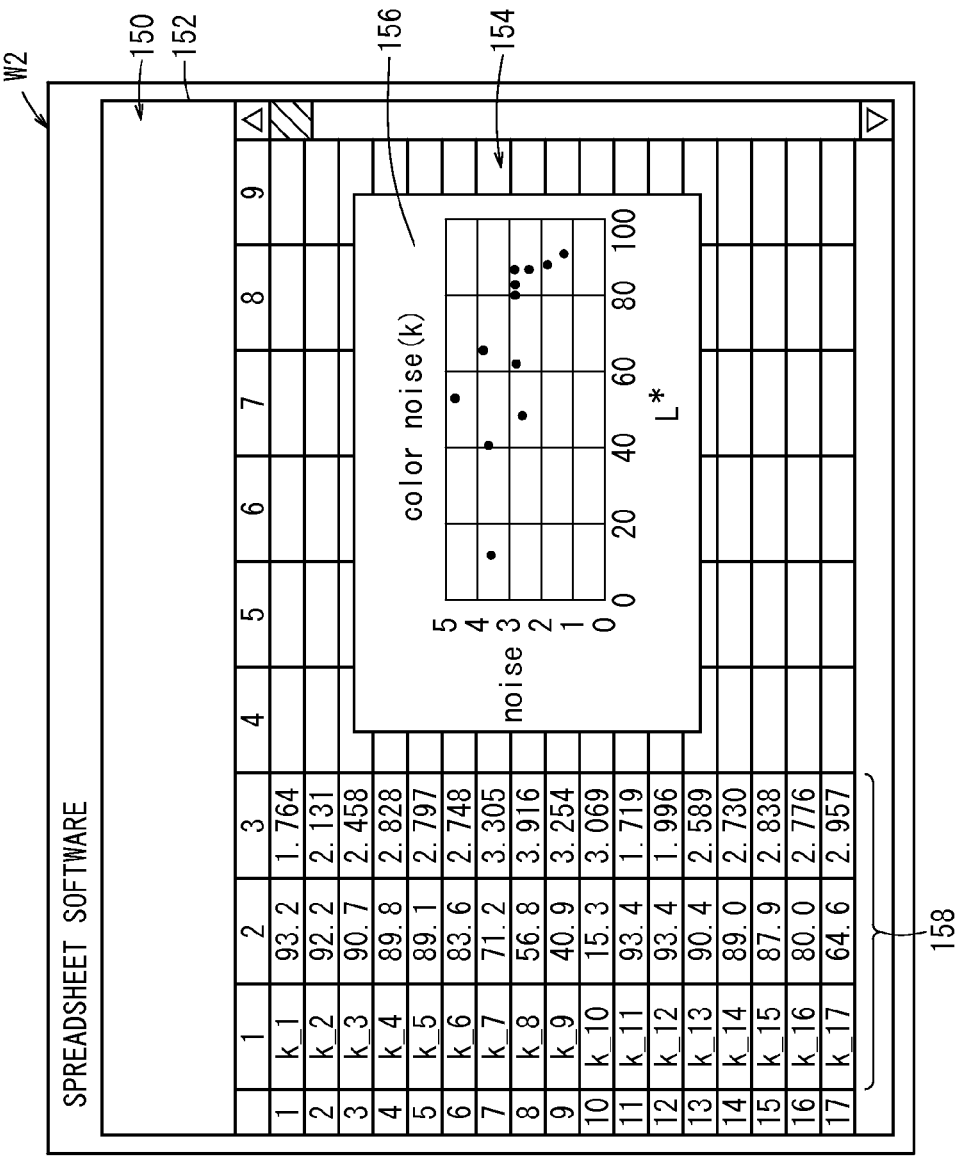
FIG. 9 is a view showing a displayed image representing measurement results.

As shown in FIG. 9, in response to a user's action to open a measurement result file, the spreadsheet software displays a window W2 on the display unit 56 under the control of an operating system (OS). The window W2 has a result screen 150 including a tool bar 152 with operating irons, not shown, a worksheet 154 with a plurality of cells for table calculations, and a graph 156 superimposed on a portion of the worksheet 154. The graph 156 is generated in accordance with a pre-designated format and reference data (each value in a predetermined cell). In FIG. 9, the graph 156 is automatically generated as desired by referring to a cell group 158, which represents specific numerical values of lightness and granularity, for example, on the worksheet 154 without the need for special actions of the user.

In step S10, the measurement result file generated in step S9 is uploaded into the server 28. Specifically, the image evaluating apparatus 32 sends the measurement result file to the server 28 through the communication I/F 52, the LAN 36, and the router 26. The measurement result file received by the server 28 is stored in a memory thereof. The server 28 successively stores measurement result files to build a database of the quantified information of evaluation charts 22c. The user who has a retrieval authority over the image information managing system 12 (hereinafter referred to as "retriever") can freely retrieve and browse the measurement results of evaluation charts 22c using the operating terminal 34 as a client.

Figure 10:
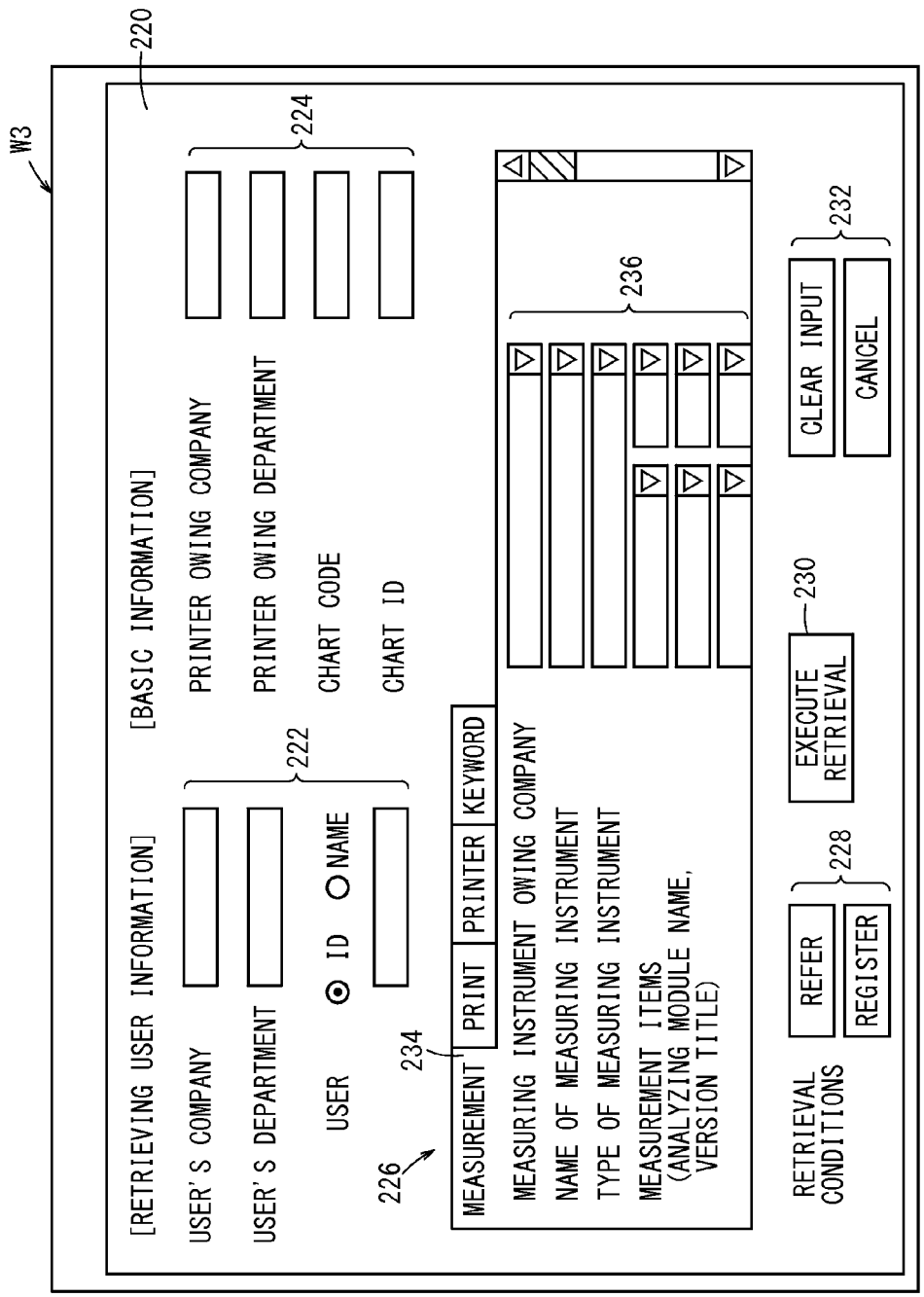
FIG. 10 is a view showing a displayed image representing a screen for retrieving image management information.

As shown in FIG. 10, a window W3 displayed on the display unit 56 has the retrieval screen 220 having a first input field 222 for entering various items of information relative to the retriever ("RETRIEVING USER INFORMATION" in FIG. 10), a second input field 224 for entering various items of information relative to basic retrieval conditions ("BASIC INFORMATION" in FIG. 10), a third input field 226 for entering various items of information relative to details retrieval conditions, buttons 228 representing "REFER", "REGISTER", a button 230 representing "EXECUTE RETRIEVAL", and buttons 232 representing "CLEAR INPUT", "CANCEL".

The first input field 222 is a field for entering the company and department thereof to which the retriever, i.e., the user of the image information managing system 12, belongs, and the user name (ID or name). The second input field 224 is a field for entering the company and department thereof which own a printer (image forming apparatus), a chart code (first code information), and a chart ID. The third input field 226 is a field for entering various retrieval conditions depending on a selected category. In FIG. 10, the third input field 226 is shown as having a detailed input field 236 relative to "MEASUREMENT" displayed in response to the retriever clicking on a tab 234. The detailed input field 236 is a field for entering the company which owns a measuring instrument, e.g., the scanner 38, the name and type of the measuring instrument, and measurement items including an analyzing module name and a version title.

After retrieval conditions have been entered, the retriever clicks on the "EXECUTE RETRIEVAL" button 230 to check the database constructed by the server 28. The retriever may browse retrieval results using the operating terminal 34, and download a retrieved measurement result file, if necessary. Measurement results of evaluation charts 22c may be retrieved and browsed through operating terminals of an external network, e.g., the RIP 18, insofar as those evaluation charts 22c are generated within the print production system 10.

As described above, an evaluation chart 22c is electronically read at one time to obtain first code information for specifying measuring conditions for the evaluation chart 22c, and second code information for specifying image forming conditions for the evaluation chart 22c, and the quantified information of test patterns 102a through 102l measured under the measuring conditions are associated with the image forming conditions. Consequently, the image forming conditions for the evaluation chart 22c and the quantified results thereof can properly be associated with each other at all times. The proper association is particularly effective if the site where the evaluation chart 22c is generated and the site where the evaluation chart 22c is measured are geographically spaced from each other.

In the illustrated embodiment, the image evaluating apparatus 32 as an image information managing apparatus has all functions as a first condition acquiring means, a second condition acquiring means, and an image information associating means. However, some of those functions may be assumed by another apparatus, e.g., the server 28.

Although a preferred embodiment of the present invention has been described above, it will be understood that various changes and modifications can be made therein without departing from the scope of the appended claims.

What is claimed is:

1. An image information managing method for managing quantified information produced by measuring an evaluation chart on a recording medium and quantifying quality of the measured evaluation chart, comprising the steps of:
    preparing the evaluation chart having test patterns including a pattern to be quantified, and a first code mark and a second code mark which are encoded according to a prescribed code conversion law;
    electronically reading the prepared evaluation chart at one time to acquire first code information representative of the first code mark and second code information representative of the second code mark;
    acquiring measuring conditions for the evaluation chart which are specified by the first code mark by decoding the acquired first code information according to the prescribed code conversion law;
    acquiring image forming conditions for the evaluation chart which are specified by the second code mark by decoding the acquired second code information according to the prescribed code conversion law; and
    associating the quantified information of the test patterns which is measured under the measuring conditions with the acquired image forming conditions.

2. The image information managing method according to claim 1, further comprising the step of determining a file format for managing the quantified information depending on the measuring conditions;
    wherein the step of associating quantified information comprises the step of generating a data file including the quantified information and the image forming conditions for the evaluation chart according to the determined file format.

3. The image information managing method according to claim 1, wherein the step of preparing the evaluation chart comprises the step of separately forming the first code mark on the recording medium on which the test patterns and the second code mark have already been formed.

4. The image information managing method according to claim 1, wherein the step of preparing the evaluation chart comprises the step of separately forming the second code mark on the recording medium on which the test patterns and the first code mark have already been formed.

5. The image information managing method according to claim 1, wherein the step of acquiring image forming conditions comprises the step of acquiring, as one of the image forming conditions, inherent identifying information assigned to the evaluation chart.

6. The image information managing method according to claim 2, further comprising the step of successively storing generated data files to construct a database of the quantified information.

7. The image information managing method according to claim 1, wherein
    said preparing step prepares the evaluation chart for use in said associating step, and
    a site where the evaluation chart is prepared and a site where the evaluation chart is measured are geographically the same, or are geographically spaced from each other.

8. An image information managing apparatus for managing quantified information produced by measuring an evaluation chart on a recording medium and quantifying quality of the measured evaluation chart, comprising:
    an image input unit for entering first code information representative of a first code mark and second code information representative of a second code mark which are produced by electronically reading, at one time, the evaluation chart having test patterns including a pattern to be quantified, and the first code mark and the second code mark which are encoded according to a prescribed code conversion law;
    a first condition acquirer for decoding the first code information entered by the image input unit according to the prescribed code conversion law to acquire measuring conditions for the evaluation chart which are specified by the first code mark;
    a second condition acquirer for decoding the second code information entered by the image input unit according to the prescribed code conversion law to acquire image forming conditions for the evaluation chart which are specified by the second code mark; and
    an image information associator for associating the quantified information of the test patterns which is measured under the measuring conditions acquired by the first condition acquirer with the image forming conditions acquired by the second condition acquirer.

9. An image information managing system for managing quantified information produced by measuring an evaluation chart on a recording medium and quantifying quality of the measured evaluation chart, comprising:
    an image reader for obtaining first code information representative of a first code mark and second code information representative of a second code mark which are produced by electronically reading, at one time, the evaluation chart having test patterns including a pattern to be quantified, and the first code mark and the second code mark which are encoded according to a prescribed code conversion law;
    a first condition acquirer for decoding the first code information obtained by the image reader according to the prescribed code conversion law to acquire measuring conditions for the evaluation chart which are specified by the first code mark;
    a second condition acquirer for decoding the second code information obtained by the image reader according to the prescribed code conversion law to acquire image forming conditions for the evaluation chart which are specified by the second code mark; and
    an image information associator for associating the quantified information of the test patterns which is measured under the measuring conditions acquired by the first condition acquirer with the image forming conditions acquired by the second condition acquirer.

* * * * *